United States Patent

Brown

[11] Patent Number: 5,803,547
[45] Date of Patent: Sep. 8, 1998

[54] RECLINING SUPPORT FOR ASTRONOMY OBSERVATIONS

[76] Inventor: Christopher Andrew Brown, 1 First Street, Gawler, SA 5118, Australia

[21] Appl. No.: 750,924
[22] PCT Filed: Jun. 14, 1996
[86] PCT No.: PCT/AU96/00359
§ 371 Date: Feb. 11, 1997
§ 102(e) Date: Feb. 11, 1997
[87] PCT Pub. No.: WO97/00034
PCT Pub. Date: Jan. 3, 1997

[30] Foreign Application Priority Data

Jun. 16, 1995 [AU] Australia ................... PN3599

[51] Int. Cl.⁶ ..................................................... A47C 3/18
[52] U.S. Cl. ................ 297/344.23; 297/330; 297/217.3; 297/217.1
[58] Field of Search ............... 297/217.1, 217.3, 297/330, 326, 327, 344.22, 344.23, 344.26; 475/182

[56] References Cited

U.S. PATENT DOCUMENTS

| | | | |
|---|---|---|---|
| 2,714,922 | 8/1955 | McKibban et al. | 297/330 X |
| 4,173,372 | 11/1979 | Norris | 297/330 X |
| 4,637,536 | 1/1987 | Wong . | |
| 5,042,864 | 8/1991 | Mochizuki | 297/344.22 X |
| 5,346,280 | 9/1994 | Deumite | 297/330 |
| 5,489,142 | 2/1996 | Mathieu | 297/344.23 X |

FOREIGN PATENT DOCUMENTS

| | | |
|---|---|---|
| 129626 | 11/1946 | Australia . |
| 2157555 | 10/1985 | United Kingdom . |

OTHER PUBLICATIONS

"Gleanings for ATM's", Jan., 1974 Sky and Telescope pp. 51–55.
"An Altazimuth Sky Chair", Nov., 1991 Sky & Telescope p. 545.
Jan., 1992 Sky & Telescope p. 17.
Apr., 1994 Sky & Telescope p. 103.
"In Search of a Good Binocular Mount", Jun. 1993 Sky & Telescope pp. 35–40.
Oct. 1992, Astronomy p. 12.
"Build a Reclining Binocular Mount", Apr. 1993 Sky & Telescope pp. 90–92.

*Primary Examiner*—Peter R. Brown
*Attorney, Agent, or Firm*—Watts, Hoffmann, Fisher & Heinke Co., L.P.A.

[57] ABSTRACT

A reclining support (10) suitable for astronomy observation has three sub-assemblies which can be readily connected together or dismantled. A base sub-assembly (11) has legs (12) which support a turntable (13, 14) and the turntable (13, 14) supports a chassis sub-assembly (17) which can rotate about a central pin (15) upstanding from the base (11), and further is coupled to the base (11) by an elevational tilt central link (70) which can be easily and quickly disconnected. The chassis carries on it a pair of upwardly facing "U" supports (19) by which a chair frame sub-assembly can be supported for ready removal, and the chair frame (21) itself carries a binocular frame (32, 33) in an adjustable and slidable binocular carrier sub-assembly which is coupled by simple telescopic frame members (35, 36) which can be removed from the chassis sub-assembly by sliding action of the telescopic members. This arrangement can achieve a simple lightweight observation support which is readily transported and erected.

23 Claims, 4 Drawing Sheets

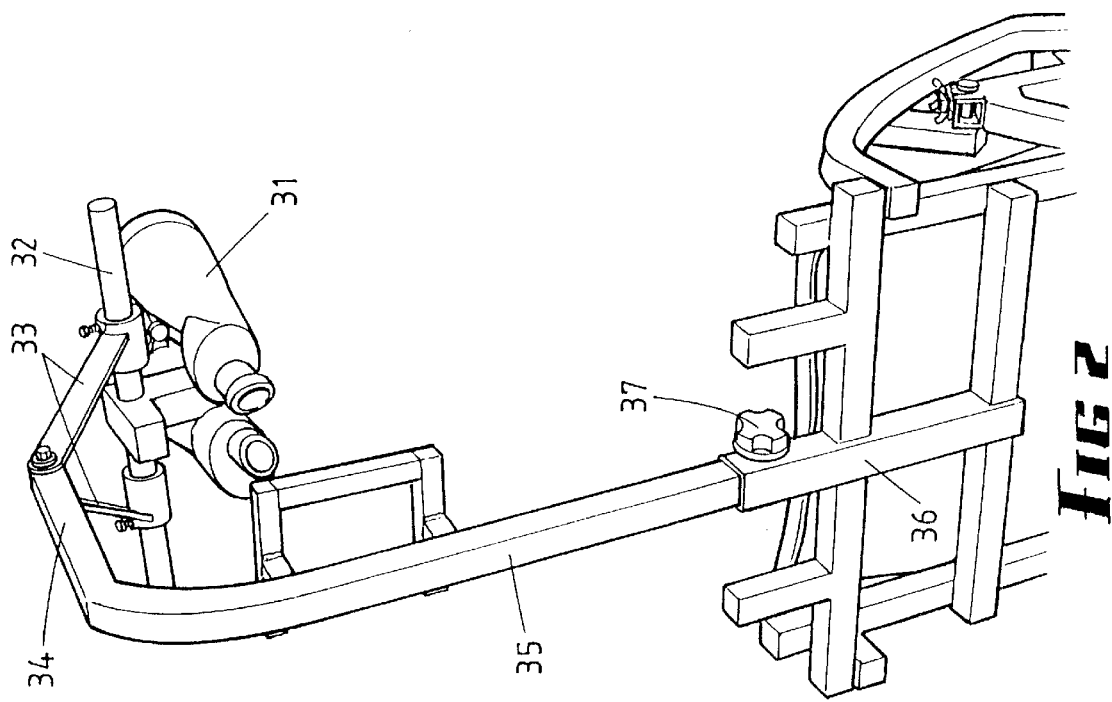
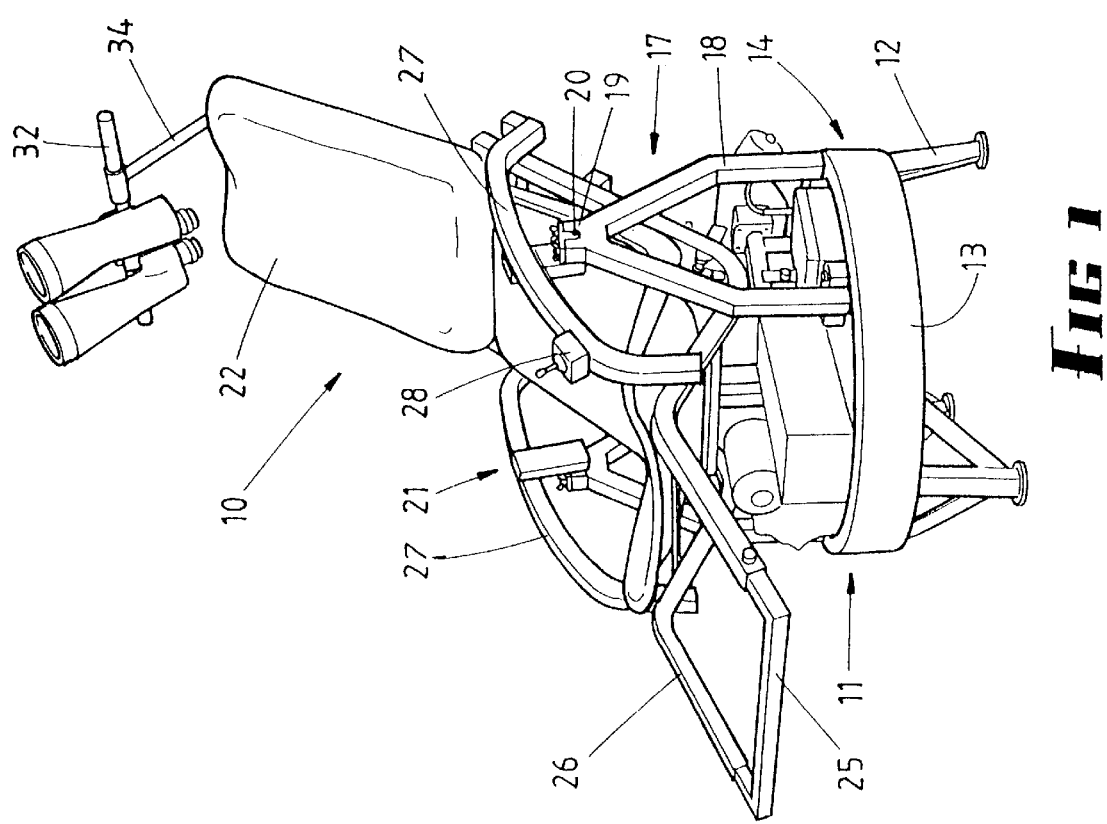

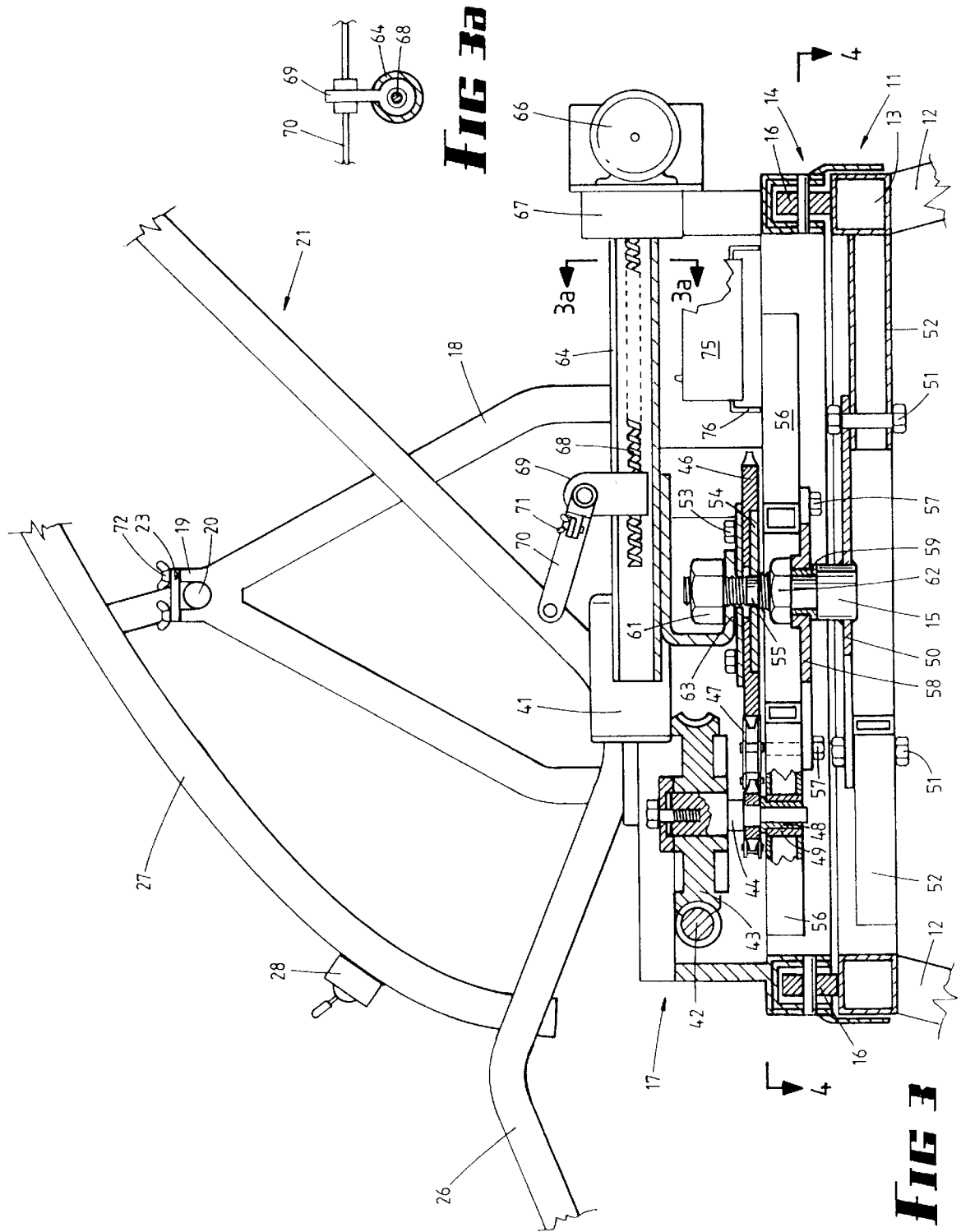

RECLINING SUPPORT FOR ASTRONOMY OBSERVATIONS

This invention relates to a reclining support, which although not limited to astronomy use, is particularly applicable to astronomy observation.

BACKGROUND OF THE INVENTION

It is known that astronomy observations sometimes use reclining supports, wherein for example the seat back of a seat and seat back assembly can tilt to some extent, and seats which rotate about vertical axes are also quite well known. It is also known to have an arrangement whereby a pair of binoculars can be held by a structure attached to a seat back, to avoid the fatigue which is encountered when binoculars are held by hand, and also to reduce the apparent target movement due to variation of line of sight. The applicant has perceived a need for a reclining support so constructed that it can be readily transported and assembled or dismantled quickly and easily, thereby making it mobile and adaptable for use by an amateur astronomer for example.

PRIOR ART

A search conducted by the applicant through available patent records was unsuccessful in locating any patent records which were of direct relevance to this invention, although the applicant may refer to the U.S. Pat. No. 4637536 in the name of Wong wherein binoculars were supported by a harness attached to a user's shoulders. Another partly relevant specification is a British specification 2157555 in the name of Maris, which provided the reclinable seat and seat back rotatable about a vertical axis, and which would carry binoculars for astronomical observation.

However, it is believed that a reference on page 51 of January 1974 U.S. Magazine "Sky and Telescope" is closer prior art than either of the above two references, which made use of a reclinable chair with a seat back, carried on a turntable and being adjustable for astronomical observation. The structure was built around an airport cargo transporter, but was much heavier and no reference was made to simple dismantling or knock-down procedures to enable a user to transport it in a motor vehicle, but rather use was made of a trailer arrangement. The inventor Pearson Menoher described this arrangement wherein "the position of the binoculars is fixed relative to the chair, but the head rest is adjustable to accommodate different observers and allow moving the head in or out of the viewing position." Referring to tilt control for varying elevational sights, he stated "in the present arrangement, tilt is controlled through a long ¾ inch screw threaded (rod) to a coupling on the footrest of the chair. This fixes the position of the chair solidly in elevation so that no movement can occur unless the long screw is turned."

The elevation drive motor was described as being similar to the one for azimuth and reference is made to a V-belt drive to a 100:1 reduction gear, and the statement was made that the flexibility of the V-belt was important which driving power must not be lost and the sheave on the elevation screw shifts position slightly as the chair rises."

In order to achieve the advantage of readily dismantling or reassembling sub-assemblies so that the operator only needs to handle light weight components, it has been necessary for the inventor herein to provide a different arrangement described by Mr Menoher, even though the Menoher arrangement obviously results in an excellent viewing arrangement.

BRIEF SUMMARY OF THE INVENTION

In this invention, a reclining support for astronomy observation is provided with three sub-assemblies which can be readily connected together or dismantled. A base sub-assembly has legs which support a turntable, and the turntable supports a chassis sub-assembly which can rotate about the central pin upstanding from the base, and further it is coupled to the base by an elevation tilt control link which can be easily and quickly disconnected. The chassis carries on it a pair of upwardly facing "U" supports by which a chair frame sub-assembly can be supported for ready removal, and the chair frame itself carries a binocular frame in an adjustable and slidable binocular carrier sub-assembly which is coupled by simple telescopic frame members which can be removed from the chassis sub-assembly by the sliding action of the telescopic members. This arrangement makes it possible to achieve a simple, lightweight observation support which is readily transported and directed, or readily dismantled, and is easily handled. The support can also be made of relatively lower cost than most other supports known to the applicant.

BRIEF SUMMARY OF THE DRAWINGS

A preferred embodiment of the invention is described hereunder in some detail with reference to and is illustrated in the accompanying drawings in which:

FIG. 1 is a perspective view of a reclining support for astronomy observation;

FIG. 2 is a perspective rear view showing the binocular support sub-assembly retained telescopically to the seat back portion of the chair frame otherwise illustrated in FIG. 1;

FIG. 3 is a fragmentary central elevational section showing the mechanism by which the azimuth rotation and elevational tilting is achieved;

FIG. 3A is a fragmentary section showing a 'C' section guide tube which contains a screw threaded rod and the tube guides a nut saddle for linear movement;

DETAILED DESCRIPTION OF THE PREFERRED EMBODIMENT

Figure 4:
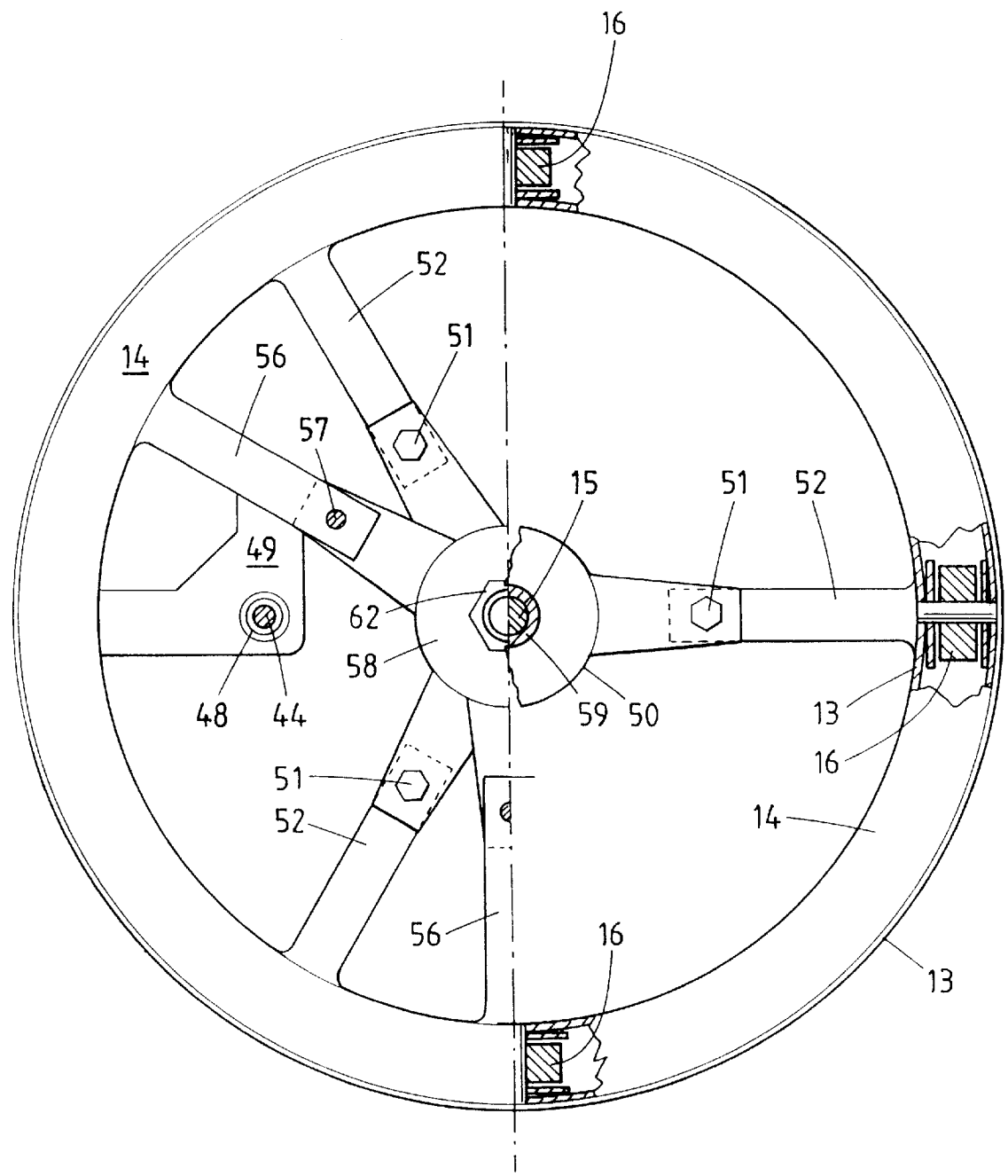
FIG. 4 is a sectioned plan view of FIG. 3, taken half on one plane and half on another.

FIG. 1 illustrates a reclining support assembly 10 which comprises three sub-assemblies, the base sub-assembly 11 having three legs 12 which supports the lower part of a turntable 13, the turntable 13 being coupled as described hereunder to its upper part 14 by a central pin 15 (FIG. 3), and a plurality of wheels 16 support the upper part 14 on the lower part 13 for rotation about the axis of the vertical pin 15. The upper part 14 of the turntable together with its surmounting components may be referred to herein as a "chassis" 17, those components including a second sub-assembly of a pair of upstanding side frames 18 of inverted Y shape and these terminate at their upper ends in respective upwardly facing "U" supports 19 which carry outwardly projecting trunnion pins 20 of a chair frame 21. The chair frame 21 supports the padded upholstery seat and seat back assembly 22 which can tilt about a horizontal axis of the trunnion pins 20. Trunnion pins 20 are retained in position by a readily removable clamp plate 23 by which the chair frame 21 can be removed from the chassis 18. The chair frame 21 is provided with a telescopic foot rest 25 which projects outwardly from downwardly sloping portions 26 of the chair and which can be adjusted for position to suit individual users, and which extends rearwardly firstly with a downwardly concave portion and then with an upwardly concave portion to support the seat and seat back respectively. These portions are connected by side arms 27, one side arm 27 carrying on it a "joystick" type switch 28. One switch part activates the elevation tilting of the chair frame and the other activates the azimuth rotation of the chassis. Alternatively, two separate switches can be used.

FIG. 2 shows more particularly the third sub-assembly of a telescopic arrangement of the mount for a binocular set 31. The binocular set 31 is carried on a mounting bar 32 of standard shape and size, the transverse mounting bar 32 itself being carried on a swivelling arm 33 in an arrangement whereby the height of the binoculars can be varied as well as the elevational adjustment. The arm 33 projects outwardly from an end 34 of a telescopic support 35 which slides in a central seat back frame member 36 which itself carries a threaded clamping screw 37.

The mechanical features of azimuth rotation and elevational tilt is graphically illustrated in FIG. 3. Azimuth rotation is controlled by an electric motor 41 which drives through a gearbox (not shown) a worm 42 which engages a wormwheel 43, the wormwheel 43 being on a spindle 44 which carries on it a sprocket pinion 45, the sprocket pinion 45 being coupled to a sprocket wheel 46 by a roller chain 47, sprocket wheel 46 being concentric with the pin 15. Spindle 44 is rotational within a bearing 48. When the motor 41 is energised, the rotation of the pinion 45 causes the chassis to move around the fixed wheel 46, which is fast with the central pin 15, thereby fast with the turntable lower part 13. As will be seen from FIGS. 3 and 4, spaced lugs of a star-shaped plate 50 are secured by fasteners 51 to inwardly directed radial tubular spokes 52 fast with respect to the lower turntable part 13, and central pin 15 is welded at its lower end to plate 50, while fasteners 53 secure wheel 46 to a second annular plate 54 also fast with the central pin 15. As shown, plate 54 is fast with pin 15 by a self locking taper 55, but can be keyed to pin 15, or in some instances, welded.

In the same way that plate 50 is secured to radial tubular spokes 52 which are inwardly directed from the turntable lower part 13, spokes 56 project radially inwardly from the upper part 14 of the turntable. Fasteners 57 secure rotating plate 58 to inwardly directed radial spokes 56, so that plate 58 rotates along with the upper part 14 of the turntable, around a bearing 59. While the bearing surface can be a surface of the pin 15, it is preferred to utilise a bush as shown. This constrains the rotation to be coaxial with the pin 15. A bracket 49 fast with spokes 56 carried bearing 48 of the sprocket pinion 45.

It is important that there should be a minimum of vibration or flex on any movement, and this is achieved in this invention by the use of nylon lock nuts 61, 62, nylon nut 61 bearing against a foot 63 of a C-shaped guide tube 64 (FIG. 3A), and nut 62 bearing through an annular collar against the bearing 59 of the rotating plate 58. The base and chassis sub-assemblies can be readily disassembled by removal of lower star plate fasteners 51, or nuts 61 and 62.

In order to effect elevational tilting of the chair frame 21 about the axis of its trunnion pins 20, there is provided an elevating motor 66 (FIG. 3) and this drives through a reduction gear 67 to rotate a screw threaded rod 68 which moves a nut saddle 69 coupled to the frame 21 by means of a coupling link 70 which functions as a pitman arm. However, the coupling is by means of a thumb screw 71 which can be easily removed, and if the thumb screws 72 are also removed from the upper end of U supports 19, the chair frame can be lifted away from the side frames 18. Dismantling and reassembling and simply and quickly effected.

FIG. 3 also shows a battery 75 carried on a cradle 76 which will rotate along with the turn table upper part 14 and the two control motors 41 and 66, thereby avoiding the need for slip rings otherwise required for delivery of power to the motors, and also to the control means.

Figure 5:
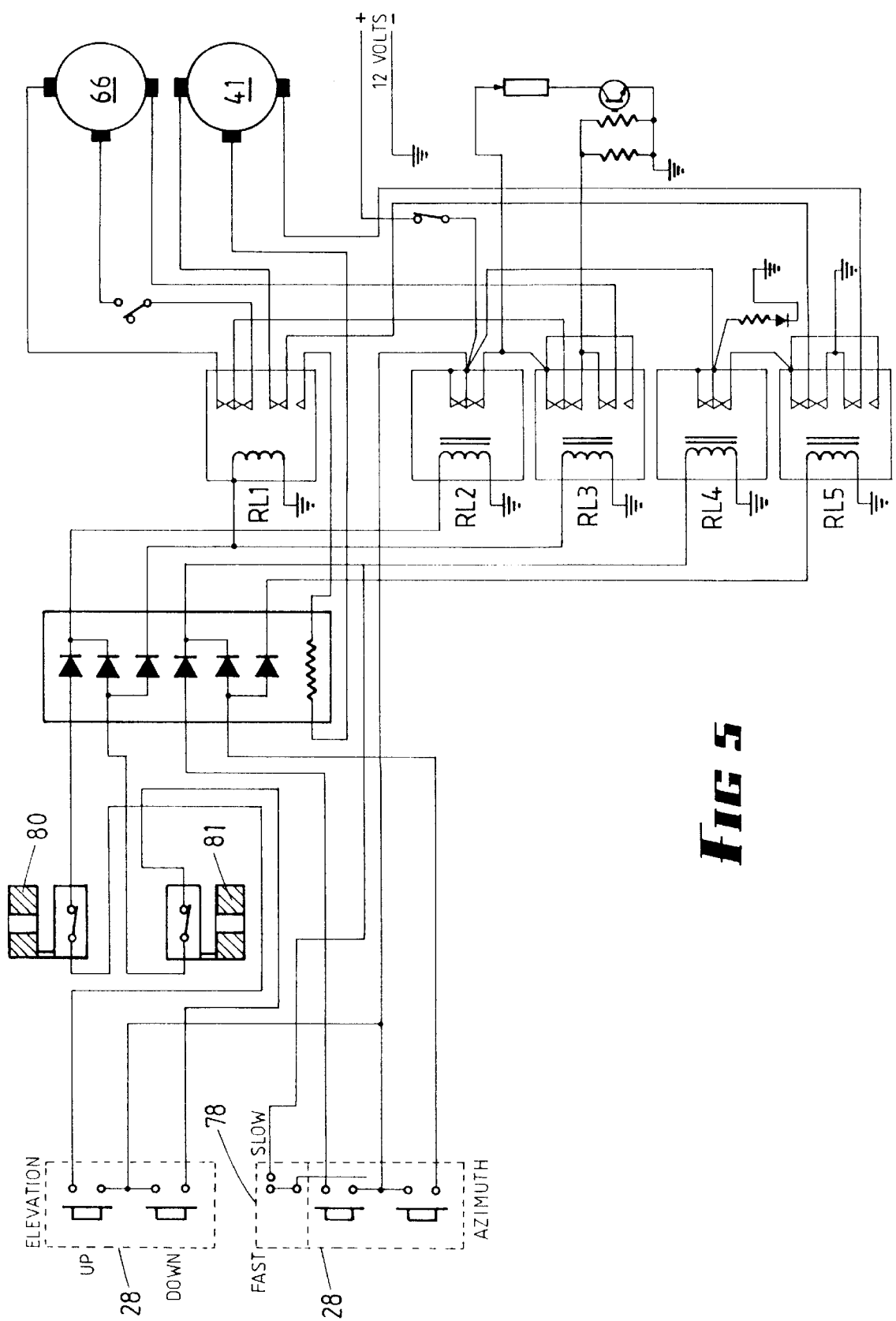
FIG. 5 is a wiring diagram which shows the controls which are used for controlling the speed and direction of rotation of azimuth and elevational control motors.

FIG. 5 illustrates the arrangement wherein the switch 28 controls elevation and azimuth movement, while a fast/slow switch portion 78 controls the speed of both azimuth and elevation movement.

Relay RL1 controls the fast and slow functions of the azimuth motor, relay RL2 provides the elevational power for the motor 66, relay RL3 controls the elevational movement up and down, relay RL4 controls the power for the azimuth motor 41 and relay RL5 provides the azimuth rotation forward or reverse. Electronic encoders are optionally used between the base, chassis and seat frame sub-assemblies to provide repeatable settings for the reclining support.

In order to limit over run in elevation in either the rearward movement of the seat back or the forward and downward movement of the front of the chair frame 21, there are provided respective magnetic normally closed limit switches 80 and 81. Other aspects of the electrical circuit of FIG. 4 are conventional.

The electrical connection between the chair frame and base sub-assemblies can be by means of a six core cable and disconnection achieved by a six pin male/female plug and socket.

A reclining support in accordance with the above embodiment will be found to be capable of being produced in very light weight and inexpensively and the provision of the three sub-assemblies which are easily dismantled or reassembled together avoids the need to handle excessively heavy objects. The amount of power absorbed is very small so that the battery 75 needs to be only small, say for example 12 volts by 60 amp/hours. The amount of elevation which can be achieved is very considerable, the described embodiment exceeds 90° of movement, and the elevation will be seen to be about an axis which can be almost aligned with the hip joint axis of a user.

The claims defining the invention are as follows:

1. A reclining support assembly comprising:
   a) a base sub-assembly including a central upstanding pin and a toothed wheel concentrically fixed to the pin;
   b) a chassis sub-assembly rotatively supported by the base sub-assembly, the chassis and base sub-assemblies forming a turntable with the base sub-assembly being a fixed and lower portion of the turntable, and the chassis sub-assembly forming a rotatable and upper portion of the turntable when the assembly is in use;
   c) a chair frame sub-assembly supported by the chassis sub-assembly the frame sub-assembly including a chair frame and a binocular mount;
   d) chair rotating means supported by the chassis sub-assembly, the chair rotating means including a first motor for controllably driving a drive, the drive engaging the toothed wheel whereby rotation of the drive effects rotation of the chassis sub-assembly about the toothed wheel thereby effecting rotation of the chassis sub-assembly with respect to the base sub-assembly.
   e) a tilt drive sub-assembly for effecting tilting of the chair frame sub-assembly with respect to the chassis sub-assembly, the tilt drive sub-assembly being supported by the chassis sub-assembly and including a second motor controllably driving a linkage, the linkage being coupled to the chair frame sub-assembly and to the second motor whereby movement of the linkage tilts the chair frame sub-assembly with respect to the chassis sub-assembly; and, f) releasable coupling means between the chassis and chair sub-assemblies for permitting ready disassembly and reassembly of the reclining support assembly.

2. A reclining support assembly as in claim 1 further comprising a readily releasable coupling between the chair frame and the binocular mount.

3. A reclining support as in claim 2, wherein the readily releasable coupling between the chair frame and the binocular mount includes two telescopingly slidable members.

4. A reclining support assembly as in claim 1 wherein the upstanding pin includes a bearing surface near a lower end thereof, said chassis sub-assembly including constraining means for surrounding and coacting with the bearing surface for constraining rotational movement of the chassis sub-assembly about the upstanding pin when the drive effects relative rotational movement of the chassis sub-assembly and the base sub-assembly.

5. A reclining support assembly as in claim 4, wherein the constraining means includes a plate transverse to the upstanding pin, and the chassis sub-assembly includes inwardly directed radial spokes connected to the plate.

6. A reclining support assembly as in claim 4, wherein the upstanding pin includes threaded portions above the bearing surface, there being two nuts threadably engaging the threaded portions, a lower one of the nuts constraining said constraining means against axial displacement along the upstanding pin, and an upper one of the nuts fastening the toothed wheel to the upstanding pin.

7. A reclining support assembly as in claim 1, wherein the teeth of the toothed wheel are chain sprocket teeth, the first motor is an electric motor, the chair rotating means includes a worm rotatively connected to the electric motor, the drive is a worm wheel connected to a spindle and engaging the worm, a chain sprocket is also mounted on the spindle, and a chain couples the chain sprocket and the toothed wheel.

8. A reclining support as in claim 1, wherein the chassis sub-assembly further comprises a pair of spaced upstanding side frames each terminating at their upper ends in upwardly open "U" shaped supports, the chair frame sub-assembly further comprises a pair of axially aligned trunnion pins engagable in the "U" shaped supports, and the readily releasable coupling means between the chassis and chair sub-assemblies include clamp plates which overlie respective trunnion pins and fastening means to fasten the clamp plates to the chassis sub-assembly thereby releasably retaining the trunnion pins within the respective "U" shaped supports.

9. A reclining support as in claim 1, wherein a pivot means couples the chassis sub-assembly to the chair frame sub-assembly, and wherein the second motor is an electric motor and the tilt drive sub-assembly includes a gear box drivingly connected to the electric motor, and wherein the linkage includes a screw threaded rod coupled to the output of the gear box, a nut saddle threadably engaging the threaded rod, a "C" section guide tube about the threaded rod for guiding the nut saddle in linear movement, and a pitman arm pivoted at one end to the nut saddle and at the other end to the chair frame sub-assembly.

10. A reclining support as in claim 9, comprising a rod mount supporting the threaded rod for rotation about a longitudinal axis and axially fixing the rod relative to the chassis sub-assembly.

11. A reclining support as in claim 1, wherein the chair frame sub-assembly includes tubular side members proximal to a lower end of the chair frame sub-assembly and a foot rest telescopically slidably connected to the side members and means for fixing the relative position of the foot rest and to the side members.

12. A reclining support assembly comprising:

a turntable comprising an upper rotatable chassis sub-assembly and a lower ground engaging base sub-assembly, the chassis and base sub-assemblies being relatively rotatable about an axis of rotation;

a chair sub-assembly tiltably supported by the chassis sub-assembly;

chair rotating means acting between base sub-assembly and chassis sub-assembly for effecting rotation of the chassis sub-assembly relative to the base sub-assembly, the chair rotating means including a first drive wheel central to and fixed to the base sub-assembly coaxial with the axis of rotation, and a second drive wheel supported by the chassis sub-assembly and driven by a first motor, the second drive wheel being coupled to the first drive wheel to rotate relative to the first drive wheel;

tilt drive means acting between the chassis sub-assembly and the chair sub-assembly for selective and controlled tilting of the chair sub-assembly with respect to the chassis sub-assembly, the tilt drive means being supported by the chassis sub-assembly and including a second motor for controllably driving a linkage coupling the chair frame sub-assembly to the second motor, the linkage when driven being operable to tilt the chair frame sub-assembly relative to the chassis sub-assembly; and, an optical instrument mount supported by the chair sub-assembly for holding an optical viewing instrument.

13. A reclining support as in claim 12, further comprising a readily releasable coupling means between the chassis and chair sub-assemblies, and a further readily releasable coupling between the chair frame and the optical instrument mount, the releasable couplings permitting ready disassembly and reassembly of the reclining support assembly.

14. A reclining support as in claim 12, wherein the first motor is an electric motor.

15. A reclining support as in claim 12, wherein both the first and second drive wheels are chain sprockets and the coupling between the first and second drive wheels is a chain.

16. A reclining support as in claim 12, wherein the first and second drive wheels are chain sprockets, the coupling between the first and second drive wheels is a chain, the first motor is an electric motor mounted on the chassis sub-assembly, the electric motor drives a worm, a worm wheel is on a spindle and in driveable engagement with the worm, and the second drive wheel is axled on the spindle and rotation of the worm wheel effects rotation of the second drive wheel, chain and chassis sub-assembly about the spindle.

17. A reclining support as in claim 12, further comprising trunnions between and coupling the chassis sub-assembly and the chair sub-assembly and thereby the chair sub-assembly is tiltably supported by the chassis sub-assembly, and wherein the chassis sub-assembly includes two spaced upstanding side frames respectively including aligned first parts of the trunnions, the chair sub-assembly including two spaced, axially aligned second parts of the trunnions, the second parts being in respective engagement with the first parts of the trunnions, the second motor being mounted on the chassis sub-assembly for driving the linkage, the linkage including a pitman arm coupling the chassis sub-assembly and chair sub-assembly whereby operation of the second motor effects and movement of the pitman arm tilting of the chair sub-assembly relative to the chassis sub-assembly.

18. A reclining support as in claim 17, wherein the second motor is an electric motor driving a gear box in driving connection to the linkage, and the linkage includes a screw threaded rod coupled to the output of the gear box, a nut saddle threadably engaging the rod, and a "C" section guide tube about the rod for guiding the nut saddle in linear movement, and a pitman arm is pivotally connected to the nut saddle and to the chair sub-assembly.

19. A reclining support as in claim 18, further comprising a rod mount supporting the rod for rotation of the rod about a longitudinal axis and otherwise supporting the rod fixed relative to the chassis sub-assembly.

20. A reclining support as in claim 12, wherein the base sub-assembly includes a ring portion, a first center portion coaxial with the ring portion and supporting the first drive wheel, a plurality of first spokes radially spaced about the center portion and extending between the first center portion and the first ring portion, and wherein the chassis sub-assembly comprises a second ring portion, a second center portion coaxial with the second ring portion, a plurality of second spokes radially spaced about the second center portion and extending between the second center portion and the second rind portion, and a plurality of wheels mounted on the second ring portion and bearing against the first ring portion for rotatable support of the second ring portion.

21. A reclining support assembly comprising:

an upper chassis sub-assembly and a lower ground engaging base sub-assembly, the chassis and base sub-assemblies being relatively rotatable about an axis of rotation;

a chair sub-assembly tiltably supported by the chassis sub-assembly;

chair rotating means operably interposed between base and chassis sub-assemblies for effecting relative rotation of the chassis and base sub-assemblies, the chair rotating means including a first drive wheel fixed to the base sub-assembly and coaxial with the axis, and second drive wheel supported by the chassis sub-assembly and drive by a first electric motor, the second drive wheel being operably connected to the first drive wheel to rotate about the first drive wheel;

tilt drive means operably interposed between chassis sub-assembly and chair sub-assembly for selective and controlled tilting of the chair sub-assembly with respect to the chassis sub-assembly, the tilt drive means being supported by the chassis sub-assembly and including second electric motor for controllably driving a linkage, the linkage being coupled to the chair frame sub-assembly and to the second electric motor for motor movement to tilt the chair frame sub-assembly relative to the chassis sub-assembly;

an electrical power source mounted on the chassis sub-assembly and connected to the motor to provide power to the motors in relatively fixed positions whereby to maintain constant spacial relationships among the source and the motors irrespective of the relative positions of the sub-assemblies; and, an optical instrument mount supported by the chair sub-assembly for holding an optical viewing instrument.

22. A reclining support assembly comprising:

an upper rotatable chassis sub-assembly rotatably mounted on a lower ground engaging base sub-assembly for rotation about an axis;

a chair sub-assembly readily releasably and tiltably supported by the chassis sub-assembly;

chair rotating means operably interposed between base sub-assembly and chassis sub-assembly for effecting rotation of the chassis sub-assembly relative to the base sub-assembly, the chair rotating means including a first drive wheel fixed to the base sub-assembly and coaxial with the axis, and a second drive wheel supported by the chassis sub-assembly and drivably connected to the first motor, the second drive wheel being operably connected to the first drive wheel to rotate about the first drive wheel;

tilt drive means operably interposed between the chassis and chair sub-assemblies for selective and controlled tilting of the chair sub-assembly with respect to the chassis sub-assembly, the tilt drive means being supported by the chassis sub-assembly and including a second motor and a linkage coupling the chair frame sub-assembly to the second motor whereby movement of the linkage tilts the chair sub-assembly with respect to the chassis sub-assembly; and, an optical instrument mount supported by the chair sub-assembly for holding an optical viewing instrument, the optical instrument mount being readily releasably supported by the chair sub-assembly.

23. A reclining support assembly comprising:

a ground engaging base sub-assembly rotatably supporting a chassis sub-assembly for relative rotation about an axis;

a chair sub-assembly tiltably supported by the chassis sub-assembly;

chair rotating means operably interposed between the base and the chassis sub-assemblies for effecting rotation relative to the chair rotating means including a first drive wheel fixed to the base sub-assembly and coaxial with the axis, and a second drive wheel supported by the chassis sub-assembly drivingly connected to first motor, the second drive wheel being operably connected to the first drive wheel to rotate about the first drive wheel;

tilt drive means operably interposed between chassis and chair sub-assemblies for selective and controlled tilting of the chair sub-assembly with respect to the chassis sub-assembly, the tilt drive means being supported by the chassis sub-assembly and including a second motor for controllably driving a linkage, the linkage including a pitman arm coupling between the chair frame sub-assembly and the second motor for motor driven movement of the linkage to tilt the chair frame sub-assembly relative to the chassis sub-assembly; and, an optical instrument mount supported by the chair sub-assembly for holding an optical viewing instrument.

* * * * *